United States Patent
Thiele et al.

(10) Patent No.: US 8,180,066 B2
(45) Date of Patent: May 15, 2012

(54) METHOD AND SYSTEM FOR TRANSMITTING AUDIO SIGNALS

(75) Inventors: Bernd Thiele, Kronach (DE); Reinhold Schaef, Rednitzhembach (DE)

(73) Assignee: Lear Corporation, Southfield, MI (US)

( * ) Notice: Subject to any disclaimer, the term of this patent is extended or adjusted under 35 U.S.C. 154(b) by 943 days.

(21) Appl. No.: 12/192,644

(22) Filed: Aug. 15, 2008

(65) Prior Publication Data
US 2009/0086983 A1    Apr. 2, 2009

(30) Foreign Application Priority Data
Sep. 27, 2007  (DE) .................... 10 2007 046 636

(51) Int. Cl.
*H04R 5/00* (2006.01)
*H04B 3/00* (2006.01)
(52) U.S. Cl. ............ 381/86; 381/119; 455/99; 398/187
(58) Field of Classification Search .................. 381/119, 381/86; 455/91–129, 151.2; 398/182–201
See application file for complete search history.

(56) References Cited

U.S. PATENT DOCUMENTS

| 6,597,301 | B2 * | 7/2003 | Cerra | 341/155 |
| 2002/0102000 | A1 * | 8/2002 | Tanaka | 381/77 |
| 2003/0152243 | A1 * | 8/2003 | Julstrom et al. | 381/315 |
| 2004/0131212 | A1 | 7/2004 | Chang | |
| 2004/0234081 | A1 * | 11/2004 | Brice et al. | 381/86 |
| 2005/0094819 | A1 * | 5/2005 | Huang | 381/1 |
| 2006/0218595 | A1 * | 9/2006 | Chang | 725/75 |
| 2007/0091516 | A1 * | 4/2007 | Takano | 361/18 |
| 2007/0242834 | A1 * | 10/2007 | Coutinho et al. | 381/71.8 |

FOREIGN PATENT DOCUMENTS

DE    40 42 088    11/1991

OTHER PUBLICATIONS

Informationstechnik, Prof. Dr.-Ing, Norbert Fliege, Hamburg-Harburg, B.G. Teubner Stuttgart 1996.
First Examination Report from the German Patent Office dated Jul. 14, 2008 for the corresponding German Patent Application No. 10 2007 046 636.8-35.

* cited by examiner

*Primary Examiner* — Kiesha Bryant
*Assistant Examiner* — Eric Ward
(74) *Attorney, Agent, or Firm* — Brooks Kushman P.C.

(57) ABSTRACT

A system and method of transmitting audio signals. Frequency modulated carrier signals that each have an audio signal are mixed. The mixed signal is converted into a low voltage signal into which a feed voltage is coupled. The coupled signal is transmitted through a single line of a transmission cable to an audio signal infrared transmitter unit.

7 Claims, 1 Drawing Sheet

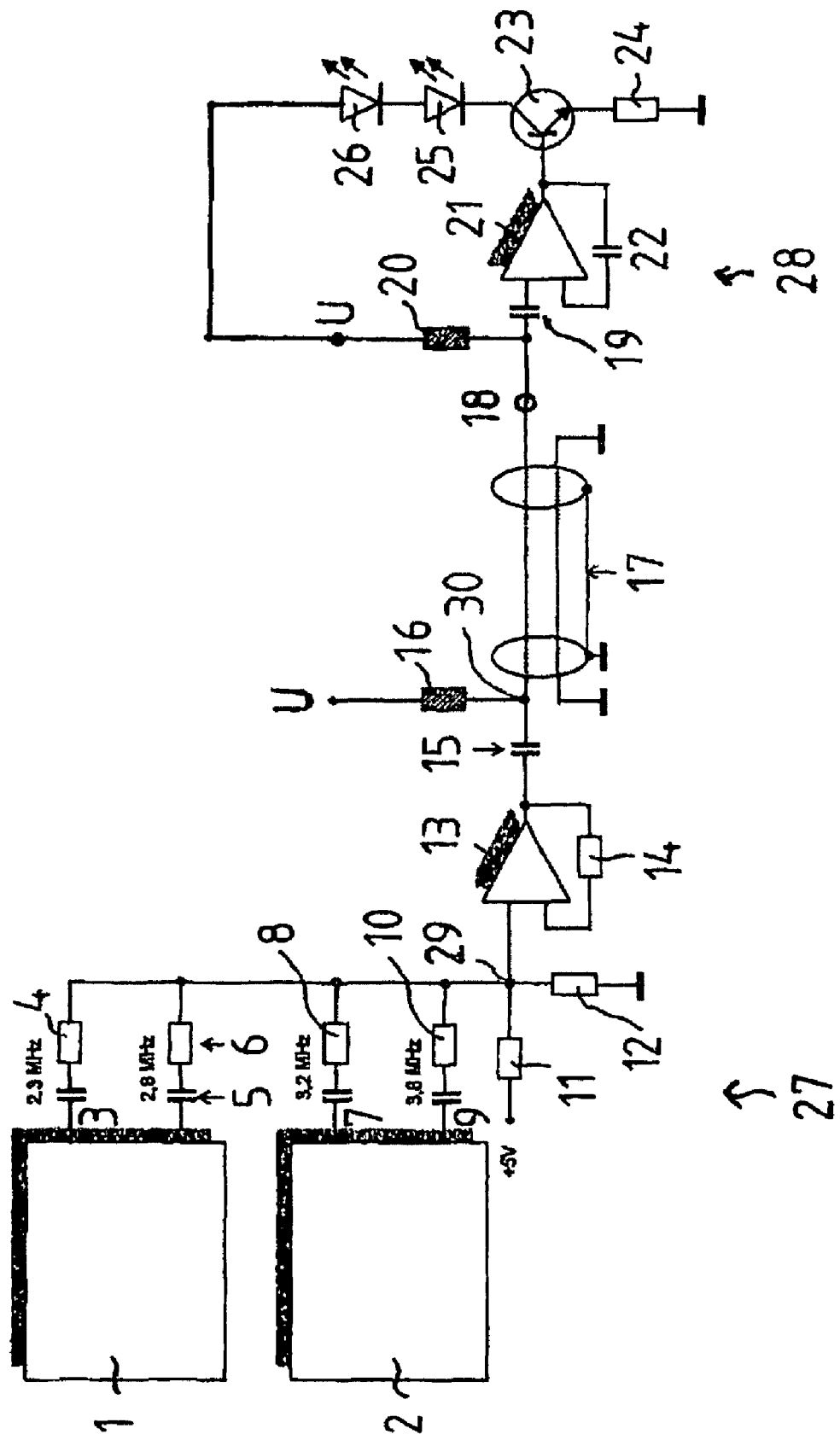

METHOD AND SYSTEM FOR
TRANSMITTING AUDIO SIGNALS

CROSS-REFERENCE TO RELATED
APPLICATIONS

This application claims foreign priority benefits under 35 U.S.C. §119(a)-(d) to DE 10 2007 046 636.8, filed Sep. 27, 2007, which is hereby incorporated by reference in its entirety.

BACKGROUND OF THE INVENTION

Field of the Invention

The present invention relates to an audio system and a method of transmitting audio signals.

SUMMARY OF THE INVENTION

In at least one embodiment of the present invention a method of transmitting an audio signal is provided. The method may include mixing frequency modulated carrier signals that each have an audio signal, converting the composite signal into a low voltage signal into which a feed voltage is coupled, and transmitting the coupled signal through a single line of a transmission cable to an audio signal infrared transmitter unit.

In at least one other embodiment of the present invention an audio system is provided that includes a modulation device for frequency modulation of n carrier signals of different frequencies, a mixer to which frequency modulated signals from the modulation device are fed, a low voltage converter electrically connected to the mixer, and a choke for coupling a feed voltage into a low voltage signal.

In at least one other embodiment of the present invention an audio system is provided. The audio system includes an audio infrared transmitter unit having a signal input for receiving a transmitted signal, a choke connected to the signal input for decoupling a feed voltage from the transmitted signal, a capacitor circuit for decoupling a low voltage signal from the transmitted signal, an operational amplifier electrically connected to the capacitor circuit, a transistor stage connected to the operational amplifier; and infrared emitters connected to the transistor stage.

BRIEF DESCRIPTION OF THE DRAWINGS

FIG. 1 is a block circuit diagram of a system for transmitting audio signals.

DETAILED DESCRIPTION

Referring to FIG. 1, a block circuit diagram of a system for transmitting audio signals is shown. The system includes an audio signal conditioning unit 27, an audio signal infrared transmitter unit 28, and a transmission or connection cable 17.

The connection cable 17, which may be shielded, connects the audio signal conditioning unit 27 with the audio signal infrared transmitter unit 28. Depending on the cable run selected, the cable 17 may be up to several meters in length. In addition, only two wires of the connection cable 17 may be used for the control and power supply of the audio signal infrared transmitter unit 28. Furthermore, no electromagnetic voltage noise may be generated by the audio signal transmitted through the cable 17.

The audio signal conditioning unit 27 may be a control unit provided in a motor vehicle in which audio signal conditioning takes place. For example, the control unit may be a DVD player that is positioned in the region between the driver and passenger seats. In addition, the control unit may be connected to one or more displays that may be integrated with one or more seats.

At least one audio signal infrared transmitter unit 28 may be provided. The audio signal infrared transmitter unit 28 may be disposed proximate a rear side of a seat, such as driver and/or passenger seats. The audio signal infrared transmitter unit 28 may be an integrated component of a display mounted in a seat. Such placement may allow the signals transmitted by the audio signal infrared transmitter unit 28 to be well received by the headset of a person sitting in the rear seat of the vehicle since there are generally no obstacles that could disturb or interrupt an infrared signal transmission between the back of a front seat of the vehicle and a headset worn by a person sitting on a rear seat of the vehicle. The transmitted audio signals may be received, decoded, and reproduced by a headset.

The audio signal conditioning unit 27 may have a modulation device for frequency modulation of n carrier signals of different frequencies, each of the n carrier signals having an audio signal. The number n of carrier signals is even and is greater than or equal to 2. In the illustrated embodiment, the modulation device has a total of four frequency modulators, of which two are in modulator unit 1 and the other two are in modulator unit 2. Modulator unit 1 is assigned to an audio channel A, and modulator unit 2 is assigned to an audio channel B. The audio channels A and B each have a left channel and a right channel. The signals transmitted in these channels will subsequently be designated as audio signals.

The audio signal corresponding to the left channel of the audio channel A is modulated onto a first carrier having a carrier frequency of about 2.3 MHz in the modulator unit 1. The frequency modulated signal obtained in this manner is passed to the upper output of the modulator unit 1. In addition, the audio signal corresponding to the right channel of the audio channel A is modulated onto a second carrier having a carrier frequency of about 2.8 MHz in the modulator unit 1. The frequency modulated signal obtained in this manner is passed to the lower output of the modulator unit 1. The audio signal corresponding to the left channel of the audio channel B is modulated onto a third carrier having a carrier frequency of about 3.2 MHz in the modulator unit 2. The frequency modulated signal obtained in this manner is passed to the upper output of the modulator unit 2. In addition, the audio signal corresponding to the right channel of the audio channel B is modulated onto a fourth carrier having a carrier frequency of about 3.8 MHz in the modulator unit 2. The frequency modulated signal obtained in this manner is passed to the lower output of the modulator unit 2.

Feeding of the audio signals into the modulation device with the modulator units 1 and 2 may take place through an optical bus provided in the vehicle; for example, a MOST-bus of the motor vehicle.

The frequency modulated signals produced by the modulation device having modulator units 1 and 2 are fed into a mixer. This mixer has capacitors 3, 5, 7, and 9 as well as ohmic resistances 4, 6, 8, and 10. A capacitive mixing of the frequency modulated signals produced by modulator units 1 and 2 takes places through these capacitors. The ohmic resistances 4, 6, 8, and 10 serve to match the levels of the respective frequency modulated signals. At the output of the mixer (circuit point 29) a composite frequency modulated signal is present.

The composite signal is fed into a low voltage converter having an operational amplifier 13. One input of this operational amplifier 13 is connected to circuit point 29 (i.e., to the mixer output). The other input of the operational amplifier 13 is connected to the output of the operational amplifier 13 through an ohmic resistance 14.

The adjustment of the operating point of the operational amplifier 13 is achieved by use of a voltage divider connected upstream of the operational amplifier having ohmic resistances 11 and 12. The ohmic resistance 11 is provided between a 5V DC voltage connection and circuit point 29. The ohmic resistance 12 is positioned between circuit point 29 and ground. By means of the voltage divider 11, 12 and the operational amplifier 13, the voltage level of the composite frequency modulated signal is reduced from a voltage value of 1.5 VSS to a value of 250 mVSS to make a low voltage signal available at the output of the operational amplifier 13.

The low voltage signal is capacitively transmitted through a capacitor 15 to a circuit point 30. Here a feed voltage U is coupled into the low voltage signal through a choke 16. The feed voltage U is derived from a network component of the audio signal conditioning unit 27.

The signal received in this manner is transmitted through a first wire of a transmission cable 17 to the input 18 of the audio signal infrared transmitter unit 28. The second wire of the transmission cable 17 is used to carry a ground signal. In the embodiment shown, a shielded two-wire cable is used as the transmission cable 17.

In the audio signal infrared transmitter unit 28 the signal input 18 is connected to a choke 20 and a capacitor circuit 19 that has a capacitor in the embodiment shown.

Decoupling or extraction of the feed voltage U from the transmitted signal takes place via a choke 20. The choke 20 is connected with infrared emitters 25, 26 of the audio signal infrared transmitter unit 28, so that the feed voltage is made available to these infrared emitters.

Decoupling of the low voltage signal from the transmitted signal takes place through the capacitor 19. The decoupled low voltage signal may be provided to one input of an operational amplifier 21. The other input of the operational amplifier 21 may be connected to the output of the operational amplifier 21 through a capacitor 22. The operational amplifier 21 is then used to raise the voltage level of the transmitted low voltage signal. Furthermore, the operational amplifier 21 is used to adjust the operating point of a transistor stage 23 that is connected downstream from the operational amplifier. To do this, the output of the operational amplifier 21 is connected to the base of the npn-transistor 23 that forms the transistor stage. The emitter of the transistor 23 is connected to ground through an ohmic resistance 24. The collector of the transistor 23 is connected to the cathode of the infrared emitter 25. The anode of the infrared emitter 25 is connected to the cathode of another infrared emitter 26. The anode of infrared emitter 26 is connected to the choke 20 as previously discussed.

Driving the base of the transistor 23 opens and closes the transistor as a function of the modulation of the output signal of the operational amplifier 21 so that the infrared emitters are activated accordingly and transmit an infrared signal corresponding to the modulation.

The infrared signal is received by a receiving circuit of a headset, where it may be reconverted into audio signals, such as audio signals that correspond to the left and right channels of the audio channel A for example. These audio signals are finally reproduced through the loudspeaker of the headset.

The audio signal infrared transmitter unit 28, to which the elements 18-26 belong, may be provided as an independent module that can be placed in a position that is well suited position for radiating infrared signals. The audio signal infrared transmitter unit 28 may, for example, be constructed on its own printed circuit board. This printed circuit board can be integrated into a display inserted in the rear side of the driver's or passenger's seat. An unobstructed path is usually present from this display to the headsets worn by a person sitting in the back seat of the motor vehicle so that an interruption-free and qualitatively high-value reception is provided for the transmitted infrared signals received by the headset.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A method of transmitting audio signals, the method comprising:
    modulating a frequency of n carrier signals to produce frequency modulated signals, wherein n is an even number that is greater than or equal to 2 and wherein each of the n carrier signals has a different frequency and includes an audio signal;
    mixing the frequency modulated signals to produce a composite frequency modulated signal;
    converting the composite frequency modulated signal into a low voltage signal;
    coupling a feed voltage with the low voltage signal to produce a coupled signal;
    transmitting the coupled signal through a single line of a transmission cable to produce a transmitted signal;
    extracting the feed voltage and the low voltage signal from the transmitted signal;
    generating a prepared low voltage signal based on the low voltage signal; and
    routing the prepared low voltage signal to infrared emitters of an audio signal infrared transmitter unit.

2. The method of claim 1 wherein four carrier signals are provided, wherein the first carrier signal has a frequency of about 2.3 MHz, the second carrier signal has a frequency of about 2.8 MHz, the third carrier signal has a frequency of about 3.2 MHz, and the fourth carrier signal has a frequency of about 3.8 MHz.

3. The method of claim 1 wherein transmitting the coupled signal occurs through one line of a shielded two wire cable and a ground signal is transmitted through the other line of the shielded two wire cable.

4. The method of claim 1 wherein the feed voltage coupled with the low voltage signal is derived from a network component of an audio signal conditioning unit.

5. The method of claim 1 wherein the feed voltage extracted from the transmitted signal is routed to the infrared emitters of the audio signal infrared transmitter unit.

6. The method of claim 1 wherein the composite frequency modulated signal is reduced from a voltage value of 1.5 VSS to 250 mVSS.

7. The method of claim 1 wherein the low voltage signal extracted from the transmitted signal is subjected to an increase in voltage level.

* * * * *